3,257,377
SOAPS PREPARED FROM TALL OIL ACIDS TREATED WITH SULFUR DIOXIDE AND AN ALKALINE COMPOUND
Malcolm E. Hannah, Jr., and William D. McDavid, Pensacola, Fla., assignors, by mesne assignments, to Tenneco Chemicals, Inc., a corporation of Delaware
No Drawing. Filed Feb. 13, 1962, Ser. No. 172,881
7 Claims. (Cl. 260—97.5)

This invention relates to an improved process for the emulsion polymerization of unsaturated compounds and more particularly to an improved process for the polymerization of butadiene-1,3 compounds to provide synthetic rubber-like materials. It further relates to novel emulsifying agents for use in such emulsion polymerizations and to a process for their preparation.

It is well known that unsaturated compounds, and particularly those containing a vinyl group, may be advantageously polymerized in aqueous emulsion. For example, butadiene-1,3 compounds either alone or in admixture with styrene or other vinyl monomers can be polymerized in aqueous emulsion to produce synthetic rubber latices which can be coagulated to yield synthetic rubber.

In the emulsion polymerization of butadiene-1,3 compounds, it is customary to employ an emulsifying agent having the property of forming an emulsion of the hydrocarbon materials in the aqueous phase of the polymerization mixture. The rate at which the polymerization takes place and the properties of the resulting polymer are to a large extent dependent upon the nature of the emulsifying agent.

In the past soaps of rosin acids and of fatty acids have commonly been used as emulsifying agents in polymerizations of this type. Neither soaps of rosin acids, soaps of fatty acids, nor mixtures of these soaps have proven entirely satisfactory for this purpose. Rosin soaps impart desirable properties to synthetic rubber products, but in many cases, and particularly in polymerizations carried out at low temperatures, their use is unsatisfactory since in their presence polymerizations take place very slowly. The use of fatty acid soaps, that is, potassium and sodium soaps of fatty acids containing from 14 to 20 carbon atoms, results in a relatively fast polymerization rate. These soaps, however, do not impart the desired properties to the polymerization product. Soaps prepared from polyunsaturated fatty acids or from mixtures that contain substantial amounts of polyunsaturated fatty acids cannot be used as emulsifiers since they have an adverse effect on the rate of reaction and tend to react with the material being polymerized.

In accordance with the present invention, it has been found that when the polymerization of unsaturated compounds, such as butadiene-1,3 compounds, is carried out in the presence of an emulsifying agent that is a mixture of soaps of disproportionated rosin and dimerized fatty acids the polymerization takes place rapidly and the products formed have an excellent combination of properties. The use of the novel emulsifying agents in the low temperature copolymerization of butadiene-1,3 with styrene is particularly advantageous in that it provides a rapid polymerization and in that the polymers produced have excellent modulus of elasticity, color, and other properties.

The emulsifying agents of the present invention are mixtures that contain approximately 25% to 75% by weight of a soap of disproportionated rosin and 25% to 75% by weight of a soap of dimerized fatty acids. The preferred compositions contain approximately 50% by weight of an alkali metal soap of disproportionated rosin and 50% by weight of an alkali metal soap of dimerized fatty acids. The sodium and potassium soaps are particularly preferred as components of the emulsifying agents. These emulsifying agents are light in color, have excellent gel characteristics, are resistant to crystallization and are easy to handle. In addition they promote rapid polymerization of unsaturated compounds.

The rosin soaps that are employed in the novel emulsifying agents are soaps of disproportionated natural rosin or a rosin material containing a substantial amount of natural rosin acids, such as gum rosin, wood rosin, or tall oil rosin. The disproportionated rosin may be prepared by known procedures. For example, the rosin may be heated at a temperature between approximately 150° C. and 300° C. in the presence of a catalyst, such as palladium, platinum, nickel, iodine, sulfur, or sulfur dioxide. A suitable method for effecting disproportionation of rosin is disclosed in U.S. Patent 2,138,183.

The dimerized fatty acid soaps that are useful in the emulsifying agents are soaps of polycarboxylic acids resulting from the polymerization of drying oil or semi-drying oil fatty acids. Suitable fatty acids include polyunsaturated fatty acids, such as linoleic acid, as well as mixtures of fatty acids that contain a substantial amount of polyunsaturated acids, such as soybean oil fatty acids and tall oil fatty acids. Such acids may be dimerized, for example, by heating them under pressure in the presence of an alkaline catalyst. The term "dimerized fatty acids" as used herein is intended to include the mixture of acids resulting from the dimerization of drying oil or semi-drying oil fatty acids. This mixture ordinarily includes a major amount of dimeric acids and smaller amounts of unpolymerized (monomeric) acids, trimeric acids, and high polymeric acids. The monomeric acid portion of said mixture is made up of saturated fatty acids and fatty acids containing a single double bond. In order to obtain polymerized products having the desired combination of properties, it is necessary that the dimerized fatty acids contain little or no polyunsaturated monomeric fatty acids.

The emulsifying agents of the present invention may be prepared by mixing disproportionated rosin with dimerized fatty acids and neutralizing the resulting mixture with an alkaline material to convert the acids to the corresponding soaps. Alternatively, the soaps may be prepared separately and then combined to form the desired mixture, or the soaps may be added separately to the aqueous phase of the polymerization mixture.

The soaps of disproportionated rosin and of dimerized fatty acids may be prepared by neutralizing the acid materials with an alkaline compound, for example, an alkali metal hydroxide, such as sodium hydroxide, potassium hydroxide, or lithium hydroxide; an alkali metal carbonate, such as sodium carbonate or potassium carbonate; or ammonia. A single alkaline compound or a mixture of two or more of them may be used in the preparation of the soaps. The amount of alkaline compound employed will vary depending upon such factors as the compositon of the mixture of acids and the degree of neutralization desired. In most cases the amount of alkaline compound used is sufficient to neutralize at least 70% of the disproportionated rosin and dimerized fatty acids. The preferred products are those in which the disproportionated rosin and dimerized fatty acids have been treated with an amount of the alkaline compound that will result in the formation of high acid number soaps having high solids contents. Particularly preferred are soaps having acid numbers of approximately 135 and containing substantially no water.

In a preferred embodiment of the present invention a mixture of disproportionated rosin and dimerized fatty acids is prepared directly from tall oil. This mixture is then neutralized with an alkaline material, preferably an alkali metal hydroxide, to form a mixture of soaps that is useful in the aqueous polymerization of butadiene-1,3 compounds.

Tall oil is a by-product of the manufacture of paper pulp by the digestion of wood with alkaline liquors, such as alkaline solutions of sodium sulfide. Crude tall oil consists of a mixture of rosin acids and fatty acids in roughly equal proportions in conjunction with minor amounts of neutral, unsaponifiable materials consisting primarily of plant sterols. It is often advantageous to refine the crude tall oil to obtain products that are lighter in color and more nearly odorless. These refined products may or may not differ greatly in composition from crude tall oil depending upon the conditions used. For example, crude tall oil may be distilled in such a manner that it is possible to separate fractions consisting principally of fatty acids or of rosin acids. It is also possible to obtain fractions that have approximately the same proportions of fatty acids and rosin acids as the crude tall oil but which are substantially free of the high boiling constituents that are normally present in tall oil and which may exert inhibitory effects on both the disproportionation and polymerization reactions. These fractions may be obtained by distilling crude tall oil under vacuum at temperatures between about 150° C. and 300° C.

The starting materials that are used in the preparation of the emulsifying agents of the present invention are tall oil fractions that contain rosin acids, fatty acids, and less than approximately 5% of the aforementioned non-acid constituents. These tall oil fractions preferably contain 25% to 75% of rosin and 25% to 75% of fatty acids. As used herein the term "rosin" includes both rosin acids and the small amounts of non-acid compounds that may be present.

It has been found that both disproportionation of the rosin acids and dimerization of the fatty acids may be accomplished by contacting tall oil with sulfur dioxide at an elevated temperature and thereafter heating the sulfur dioxide-treated tall oil in the presence of an alkaline compound until the disproportionation of the rosin acids and the dimerization of the polyunsaturated fatty acids are substantially complete.

In the first step of the process, that is, treatment of tall oil with sulfur dioxide, the rosin acids are disproportionated and the polyunsaturated fatty acids converted to conjugated fatty acids. In the subsequent heating step, the conjugated fatty acids are dimerized, and the disproportionation reaction is completed.

The treatment of tall oil with sulfur dioxide may be carried out at a temperature between approximately 200° C. and 320° C., and preferably between 250° C. and 300° C. The treatment is ordinarily carried out by passing sulfur dioxide gas over the surface of the vigorously agitated tall oil or bubbling it through the tall oil at the rate of approximately 0.3% to 0.7%, and preferably approximately 0.5% per hour, based on the weight of tall oil. When sulfur dioxide is added at a rate below approximately 0.3% per hour, prolonged heating periods are required to complete the reaction, and degradation of the color and the acid value of the product may occur. The use of rates above approximately 0.7% per hour does not bring about an appreciable improvement in the reaction rate, but may result in the formation of a darkened product. The total amount of sulfur dioxide used is generally between approximately 0.3% and 2% by weight and preferably between approximately 0.5% and 1% by weight.

The sulfur dioxide-treated tall oil is heated at a temperature between approximately 250° C. and 330 C., and preferably between 290° C. and 320° C., and in the presence of an alkaline compound until the disproportionation and dimerization reactions are substantially complete. The time required for this step is dependent upon such factors as the composition of the tall oil fraction, the reaction temperature, and the properties desired in the product. In most cases the heat treatment of the sulfur dioxide-treated tall oil requires a period of approximately 2 to 8 hours.

In order to complete the dimerization reaction, it is necessary that the heating of the sufur dioxide-treated tall oil be caried out in the presence of approximately 2% to 5% of an alkaline compound, such as an alkali metal hydroxide, carbonate, or sulfide. When less than 2% of the alkaline compound is used, long heating periods are required to complete the dimerization, and the products obtained may be dark and have low acid numbers. The use of more than approximately 5% of the alkaline compound results in high viscosity products which are relatively hard to handle. Preferably 2.5% to 3.5%, based on the weight of the tall oil, of sodium hydroxide is used in this reaction. The alkaline compound may be added either before or after the treatment of the tall oil with sulfur dioxide. Alternatively, a portion of the alkaline compound may be added before the sulfur dioxide treatment is begun and the remainder added prior to or during the heating step. It is generally preferred to add the alkaline compound to the tall oil which has been heated to a temperature between approximately 190° and 200° C. before the sulfur dioxide treatment is begun.

The mixture of disproportionated rosin acids and dimerized fatty acids obtained by the hereinbefore described treatment of tall oil may be converted to water-soluble soaps that are useful as emulsifying agents in the aqueous polymerization of unsaturated compounds. Alternatively, this mixture may be blended with additional amounts of disproportionated rosin acids and/or dimerized fatty acids prior to its conversion to the soaps.

The mixed soaps of the present invention are useful as emulsifying agents in emulsion polymerization systems employing iron-pyrophosphate-hydroperoxide, sodium formaldehyde sulfoxalate-hydroperoxide, diazothioether-ferricyanide-mercaptan, and other activated recipes. These soaps are particularly useful in those recipes in which the oxidant is an organic hydroperoxide such as diisopropylbenzene hydroperoxide or p-menthane hydroperoxide, the activator is an alkali metal pyrophosphate-ferrous salt or chelated iron-sodium formaldehyde sulfoxylate composition, and the reaction modifier is an alkyl mercaptan.

Any unsaturated compound that can be polymerized by peroxide initiation in an emulsion polymerization process may be used in the practice of this invention. Illustrative of these compounds are the conjugated butadienes, such as butadiene-1,3, isoprene, chloroprene, 2,3-dimethylbutadiene-1,3, 3-furylbutadiene-1,3, mixtures of these conjugated butadienes, and mixtures of these compounds with such vinyl monomers as styrene, p-chlorostyrene, p-methoxystyrene, acrylonitrile, acrylic acid, methyl methacrylate, methyl vinyl ketone, and methyl vinyl ether. The process is particularly applicable to the preparation of copolymers of butadiene and styrene, copolymers of butadiene and acrylonitrile, and other rubber-like copolymers. It may also be used in the preparation of polyvinyl chloride, polyvinyl acetate, polyvinyl pyridine, polystyrene, and other polymers that may be prepared in aqueous emulsion.

In a preferred embodiment of the invention, butadiene is copolymerized with styrene in aqueous emulsion using as emulsifying agent a mixture of soaps of disproportionated rosin acids and dimerized fatty acids. In this process sytrene, a mercaptan reaction modifier, and an activator solution are added to an aqueous solution of the mixture of soaps. Butadiene and a hydroperoxide catalyst are then added. The polymerization is carried out at a temperature between approximately 5° F. and 120° F., and preferably between 10° F. and 50° F. Temperatures that are commonly employed for this low temperature polymerization are 14° F. and 41° F.

The novel emulsifying agents are generally employed in the amount of approximately 0.5% to 5%, and preferably 1% to 2%, based on the weight of the emulsion polymerization mixture. Based on the weight of the monomers originally present, the emulsifying agents are employed in the amount of approximately 1.5% to 15%, and preferably 3% to 6%.

The following examples will illustrate the manner in which the present invention may be practiced. It is to be understood, however, that these examples are not to be construed as being limitative, but are furnished merely for purposes of illustration.

EXAMPLE 1

Six hundred grams of a tall oil fraction that contained 26% by weight of rosin acids and 74% by weight of fatty acids was heated to 200° C. Six grams of sodium hydroxide was added, and the mixture was heated to 265° C. Sulfur dioxide was bubbled through the agitated reaction mixture at the rate of 0.5% per hour, based on the weight of the tall oil fraction, for 75 minutes during which time the mixture was maintained at 265°–285° C. After the addition of 12 grams of sodium hydroxide, the reaction mixture was heated at 290°–295° C. for 5 hours. To the resulting mixture of disproportionated rosin acids and dimerized fatty acids was added sufficient disproportionated rosin acids to form a mixture containing 50% by weight of each of the components.

EXAMPLE 2

A mixture of disproportionated rosin acids and dimerized fatty acids was prepared by the following procedure: 1535 grams of a tall oil fraction that contained 26% of rosin acids and 74% of fatty acids was heated to 200° C. Forty-six grams of sodium hydroxide was added, and the mixture was heated to 265° C. Sulfur dioxide was passed over the surface of the agitated reaction mixture at the rate of approximately 0.5% per hour, based on the weight of the tall oil fraction, for 80 minutes while the mixture was maintained at 260°–285° C. The reaction mixture was heated at 295°–300° C. for 4 hours to form a product containing 26% of disproportionated rosin acids and 74% of dimerized fatty acids.

During the course of the sulfur dioxide treatment and the subsequent heating of the tall oil fraction, the viscosity of the reaction mixture increased as the result of the conversion of poly-unsaturated fatty acids to dimerized fatty acids. This change in viscosity is shown in Table I.

*Table I*

| Step in process: | Gardner-Holdt viscosity of the reaction mixture |
|---|---|
| After addition of sodium hydroxide | R |
| After treatment with sulfur dioxide | W |
| After heat treatment for 1 hour | Y to Z–1 |
| After heat treatment for 2 hours | Z–3 |
| After heat treatment for 4 hours | Z–5 to Z–6 |

COMPARATIVE EXAMPLE A

Six hundred grams of a tall oil fraction that contained 26% of rosin acids and 74% of fatty acids was heated to 225° C. Sulfur dioxide was bubbled through the agitated reaction mixture at the rate of 0.5% per hour based on the weight of the tall oil fraction for 140 minutes while the reaction mixture was heated to 280° C. The reaction mixture was heated to 290° C. for seven hours. The product was distilled under vacuum to remove a 20% head fraction and then blended with sufficient disproportionated rosin acids to bring its content of disproportionated rosin acids to 50% by weight.

COMPARATIVE EXAMPLE B

A tall oil fraction which contained 50% by weight of rosin acids and 50% by weight of fatty acids was treated with sulfur dioxide at the rate of 0.5% per hour, based on the weight of the tall oil fraction, for approximately two hours. This reaction mixture was not treated with an alkaline compound or subjected to an extended heat treatment.

COMPARATIVE EXAMPLE C

A mixture was prepared which consisted of 50% by weight of disproportionated rosin acids and 50% by weight of hydrogenated tallow fatty acids.

EXAMPLE 3

The products of Examples 1 and 2 and of Comparative Examples A, B, and C were converted to their potassium soaps by treatment with potassium hydroxide. These soaps were then used as the emulsifying agents in the preparation of butadiene-styrene copolymers.

The copolymerizations were carried out in reactors that contained 32 ounces of the following iron-pyrophosphate-hydroperoxide recipe:

| | Parts by weight |
|---|---|
| Soap (dry basis) | 4.5 |
| Surfactant (sodium alkyl aryl sulfonate) | 0.1 |
| Potassium chloride | 0.6 |
| Ferrous sulfate | 0.16 |
| Water | 200 |
| Potassium pyrophosphate | 0.2 |
| Tertiary dodecyl mercaptan | 0.28 |
| Styrene | 25 |
| Butadiene-1,3 | 75 |
| p-Menthane hydroperoxide | 0.085 |

The following procedure was employed: An aqueous solution of the soap and potassium chloride was prepared and adjusted with potassium hydroxide to a pH in the range of 10.5–10.8. An activator solution was prepared by combining aqueous solutions of ferrous sulfate and potassium pyrophosphate. The mercaptan and p-methane were dissolved in separate portions of the styrene.

The soap solution, the styrene-mercaptan solution, the activator solution, and the butadiene were charged to the reactor in the order named. The reaction mixture was agitated for 5 minutes, and the styrene-hydroperoxide solution was added to it. The timing of the reaction was started at this time. The reaction mixture was agitated and maintained at 41° F. until the copolymerization was completed. Samples were taken periodically during the copolymerization, and the conversion of monomers to polymers was calculated for each of the samples.

In Table II are included data on the polymerization rates and on the properties of the butadiene-styrene copolymers. In this table and in Table III the rates of polymerization are reported in terms of hours required to achieve 60% conversion under the aforementioned conditions.

*Table II*

| Emulsifying Agent (as potassium soaps) | Hours to Achieve 60% Conversion of the Monomers to Polymers | Modulus of Elasticity (100 Minutes) |
|---|---|---|
| Product of Example 1 | 3¾ | 1,200 |
| Product of Example 2 | 4 | 1,200 |
| Product of Comparative Example A | 4 | 1,125 |
| Product of Comparative Example B | 4 | 1,000 |
| Product of Comparative Example C | 4 | 1,200 |

EXAMPLE 4

A series of runs was carried out in which from 1% to 5% of various alkaline compounds was used in the treatment of tall oil by the procedure described in Example 2. The resulting products, which were mixtures of disproportionated rosin acids and dimerized fatty acids, were converted to their potassium soaps. These soaps were then used as emulsifying agents in the preparation of butadiene-styrene copolymers by the procedure described in Example 3.

For comparative purposes, a series of copolymerizations was carried out in which the emulsifying agents were potassium soaps of mixtures containing approximately equal portions of disproportionated rosin acids and hydrogenated tallow fatty acids.

Data on the polymerization rates and on the properties of the butadiene-styrene copolymer are summarized in Table III.

*Table III*

|  | Alkaline Compound Used in Treatment of Tall Oil | | Comparative Examples |
|---|---|---|---|
|  | 1-2% of NaOH, KOH, Na₂S, or Na₂CO₃ | 3-5% of NaOH, KOH, Na₂S, or Na₂CO₃ | |
| Hours to Achieve 60% Conversion | 4-4½ | 3¾-4½ | 3¾-4½ |
| Modulus of Elasticity: | | | |
| 25 Min | 300±25 | 375±25 | 375±25 |
| 50 Min | 650±25 | 700±50 | 725±50 |
| 100 Min | 1,100±50 | 1,200±50 | 1,250±50 |

From the data in Table III it will be seen that the polymerization rate was generally independent of the amount or type of alkaline compound used in the treatment of the tall oil. The modulus of elasticity, however, was adversely affected by the use of less than approximately 3% of the alkaline compound.

While specific embodiments of the invention have been described herein, the invention is not to be construed as limited thereto other than as is stated in the appended claims.

What is claimed is:

1. The process which comprises contacting a tall oil fraction comprising rosin acids and fatty acids with sulfur dioxide at a temperature between approximately 200° C. and 320° C. and thereafter heating the sulfur dioxide-treated tall oil fraction in the presence of an alkaline compound at a temperature between approximately 250° C. and 330° C. until it contains substantially no polyunsaturated monomeric fatty acids thereby forming a mixture comprising disproportionated rosin acids and dimerized fatty acids.

2. The process which comprises the steps of contacting a tall oil fraction containing approximately 25% to 75% by weight of rosin acids and 25% to 75% by weight of fatty acids with sulfur dioxide at a temperature between approximately 250° C. and 300° C. and thereafter heating the sulfur dioxide-treated tall oil fraction at a temperature between approximately 290° C. and 320° C. in the presence of approximately 2% to 5%, based on the weight of the tall oil fraction, of an alkali metal hydroxide until it contains substantially no polyunsaturated monomeric fatty acids thereby forming a mixture containing approximately 25% to 75% by weight of disproportionated rosin acids and 25% to 75% by weight of dimerized fatty acids.

3. The process which comprises the steps of
(a) contacting a tall oil fraction containing approximately 25% to 75% by weight of rosin acids and 25% to 75% by weight of fatty acids at a temperature between approximately 250° C. and 300° C. with approximately 0.3% to 2%, based on the weight of said tall oil fraction, of sulfur dioxide in the presence of approximately 2% to 5%, based on the weight of said tall oil fraction, of sodium hydroxide; and
(b) heating the sulfur dioxide-treated tall oil fraction at a temperature between approximately 290° C. and 320° C. until it contains substantially no polyunsaturated monomeric fatty acids, thereby forming a mixture containing approximately 25% to 75% by weight of disproportionated rosin acids and 25% to 75% by weight of dimerized fatty acids.

4. The process which comprises the steps of
(a) contacting a tall oil fraction containing approximately 50% by weight of rosin acids and 50% by weight of fatty acids at a temperature between approximately 250° C. and 300° C. with approximately 0.3% to 2%, based on the weight of said tall oil fraction, of sulfur dioxide in the presence of approximately 2% to 5%, based on the weight of said tall oil fraction, of sodium hydroxide;
(b) heating the sulfur dioxide-treated tall oil fraction at a temperature between approximately 290° C. and 320° C. until it contains substantially no polyunsaturated monomeric fatty acids, thereby forming a mixture containing approximately 50% by weight of disproportionated rosin acids and 50% by weight of dimerized fatty acids; and
(c) neutralizing said mixture with an alkaline material selected from the group consisting of alkali metal hydroxides, alkali metal carbonates, and ammonia, thereby forming a mixture containing approximately 50% by weight of soaps of disproportionated rosin acids and 50% by weight of soaps of dimerized fatty acids.

5. The process which comprises the steps of
(a) contacting a tall oil fraction containing approximately 25% to 75% by weight of rosin acids and 25% to 75% by weight of fatty acids at a temperature between approximately 250° C. and 300° C. with approximately 0.5% to 1%, based on the weight of said tall oil fraction, of sulfur dioxide in the presence of approximately 2.5% to 3.5%, based on the weight of said tall oil fraction, of sodium hydroxide;
(b) heating the sulfur dioxide-treated tall oil fraction at a temperature between approximately 290° C. and 320° C. until it contains substantially no polyunsaturated monomeric acids, thereby forming a mixture of disproportionated rosin acids and dimerized fatty acids; and
(c) neutralizing said mixture with an alkali metal hydroxide thereby forming a mixture containing approximately 25% to 75% by weight of an alkali metal soap of disproportionated rosin acids and 25% to 75% by weight of an alkali metal soap of dimerized fatty acids.

6. The process which comprises the steps of
(a) contacting a tall oil fraction containing approximately 25% to 75% by weight of rosin acids and 25% to 75% by weight of fatty acids at a temperature between approximately 250° C. and 300° C. with approximately 0.5% to 1%, based on the weight of said tall oil fraction, of sulfur dioxide in the presence of an alkaline compound;
(b) adding to the reaction mixture an additional amount of said alkaline compound, the total amount of the alkaline compound added in steps (a) and (b) being approximately 2.5% to 3.5%, based on the weight of said tall oil fraction;
(c) heating the reaction mixture at a temperature between approximately 290° C. and 320° C. until it contains substantially no polyunsaturated monomeric fatty acids thereby forming a mixture of disproportionated rosin acids and dimerized fatty acids; and
(d) neutralizing said mixture with an alkali metal hydroxide thereby forming a mixture containing approximately 25% to 75% by weight of an alkali metal soap of disproportionated rosin acids and 25% to 75% by weight of an alkali metal soap of dimerized fatty acids.

7. The process which comprises the steps of
   (a) contacting a tall oil fraction containing approximately 25% to 75% by weight of rosin acids and 25% to 75% by weight of fatty acids at a temperature between approximately 250° C. and 300° C. with approximately 0.5% to 1%, based on the weight of said tall oil fraction, of sulfur dioxide in the presence of approximately 1% by weight of an alkali metal hydroxide;
   (b) adding to the reaction mixture approximately 2% by weight of said alkali metal hydroxide;
   (c) heating the reaction mixture at a temperature between approximately 290° C. and 320° C. until it contains substantially no polyunsaturated monomeric fatty acids thereby forming a mixture of disproportionated rosin acids and dimerized fatty acids; and
   (d) neutralizing said mixture with an alkali metal hydroxide thereby forming a mixture containing approximately 25% to 75% by weight of an alkali metal soap of disproportionated rosin acids and 25% to 75% by weight of an alkali metal soap of dimerized fatty acids.

References Cited by the Examiner

UNITED STATES PATENTS

| | | | |
|---|---|---|---|
| 2,395,278 | 2/1946 | Kalman | 260—100 |
| 2,396,646 | 3/1946 | Dressler et al. | 260—97.5 |
| 2,451,173 | 10/1948 | Richter et al. | 260—97.5 |
| 2,467,054 | 4/1949 | Rumbold | 260—23.7 |
| 2,482,761 | 9/1949 | Goebel | 260—407 |
| 2,617,792 | 11/1952 | Floyd | 260—97.5 |
| 2,794,017 | 5/1957 | Palmer et al. | 260—407 |
| 2,876,203 | 3/1959 | Miller et al. | 260—23.7 |
| 3,157,629 | 11/1964 | Patrick | 260—97.5 |

LEON J. BERCOVITZ, *Primary Examiner.*

E. J. TROJNAR, R. A. WHITE, *Assistant Examiners.*